United States Patent [19]

Krodel

[11] Patent Number: 4,486,309
[45] Date of Patent: Dec. 4, 1984

[54] SLUDGE SHOVEL APPARATUS

[76] Inventor: Leander Krodel, 24 W. Ogden, Westmont, Ill. 60559

[21] Appl. No.: 404,042

[22] Filed: Aug. 2, 1982

[51] Int. Cl.³ .............................................. B01D 21/04
[52] U.S. Cl. ..................................... 210/525; 210/527; 210/531
[58] Field of Search ............... 210/519, 525, 527, 530, 210/531, 526, 529, 800, 803; 292/121, 128, 235, DIG. 14, DIG. 51; 37/54, 71, 103

[56] References Cited

U.S. PATENT DOCUMENTS

| | | | |
|---|---|---|---|
| 2,101,079 | 12/1937 | Lund | 210/527 |
| 2,635,758 | 4/1953 | Walker | 210/526 X |
| 2,779,471 | 1/1957 | Knapp | 210/527 X |
| 3,498,465 | 3/1970 | Klump | 210/525 |
| 3,868,323 | 2/1975 | Fux | 210/527 X |
| 4,054,309 | 10/1977 | Borlinghaus | 292/DIG. 14 |
| 4,323,456 | 4/1982 | Olear | 210/529 |

FOREIGN PATENT DOCUMENTS 520935  5/1940  United Kingdom ................ 210/527

Primary Examiner—Richard V. Fisher
Assistant Examiner—W. Gary Jones
Attorney, Agent, or Firm—Neuman, Williams, Anderson & Olson

[57] ABSTRACT

In a rectangular primary sedimentation tank having a transverse trough for sludge collection, a sludge shovel apparatus is provided for efficient removal of sedimentation. In one embodiment, a reciprocative trolley assembly, hoist linkage and latching means operate together to carry a sludge shovel in a scooping position from a drop end of the trough toward a sludge withdrawal end, to vertically lift the sludge shovel above the sedimentation level, to return the sludge shovel to its starting end and to drop it for continued scooping operation. Continuous and efficient sludge removal is thereby effected with minimal disturbance of the remaining sludge during the raising and lowering of the sludge shovel.

12 Claims, 11 Drawing Figures

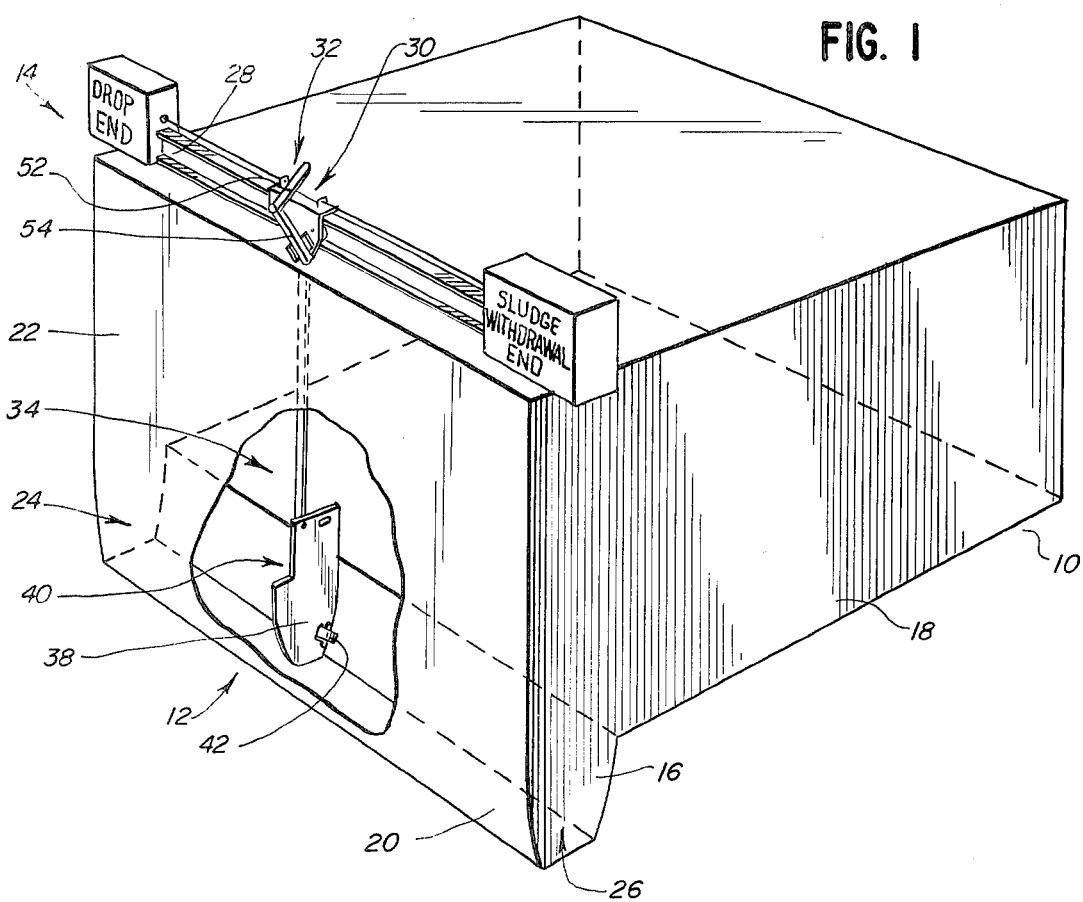
FIG. 1
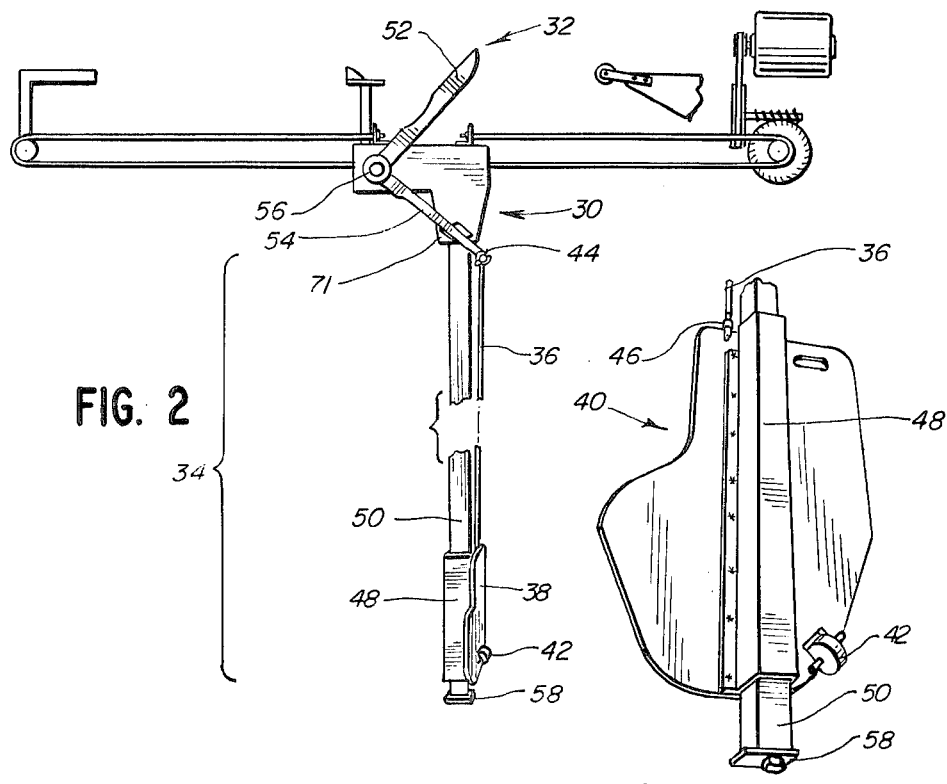
FIG. 2
FIG. 3

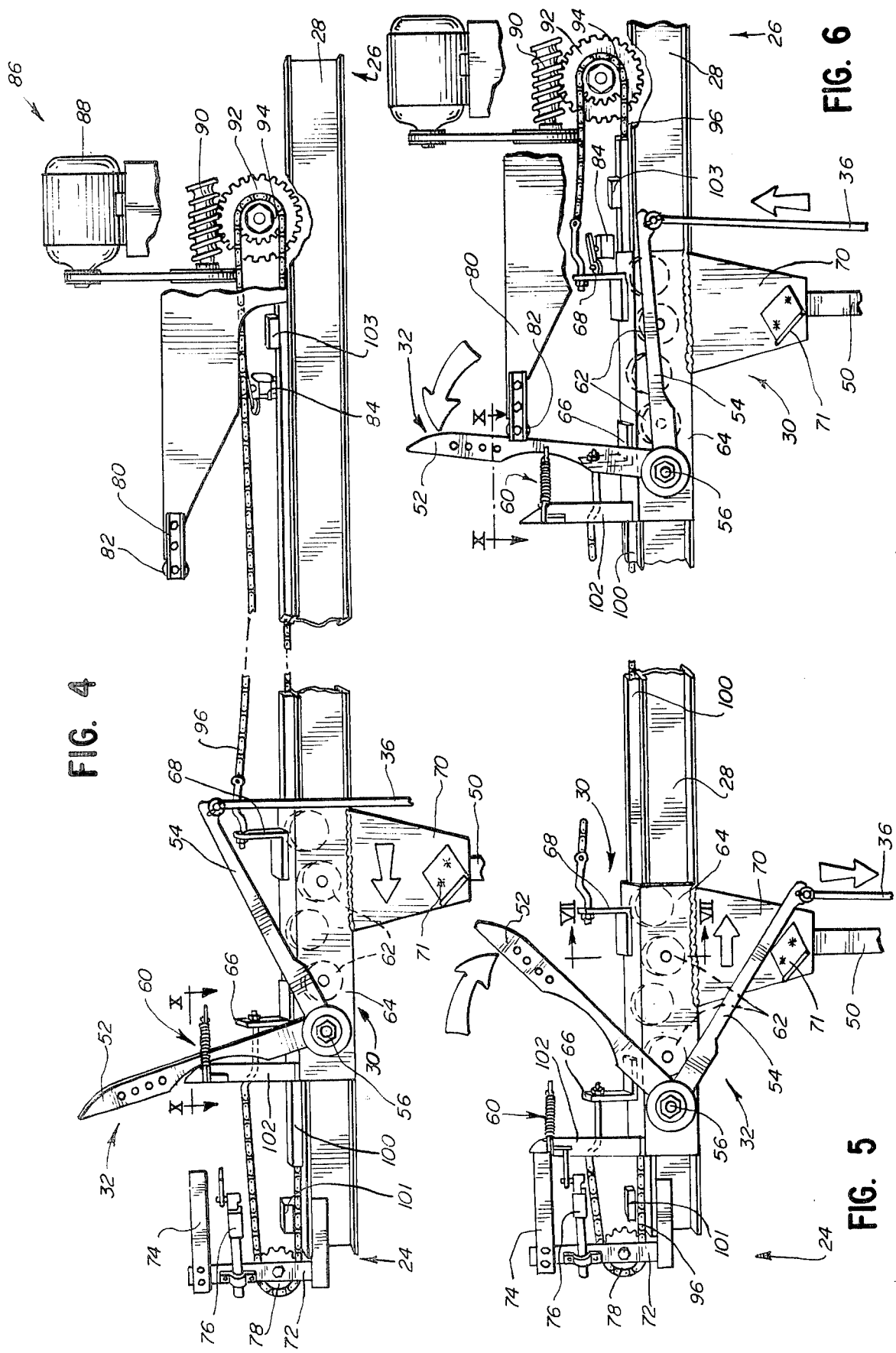

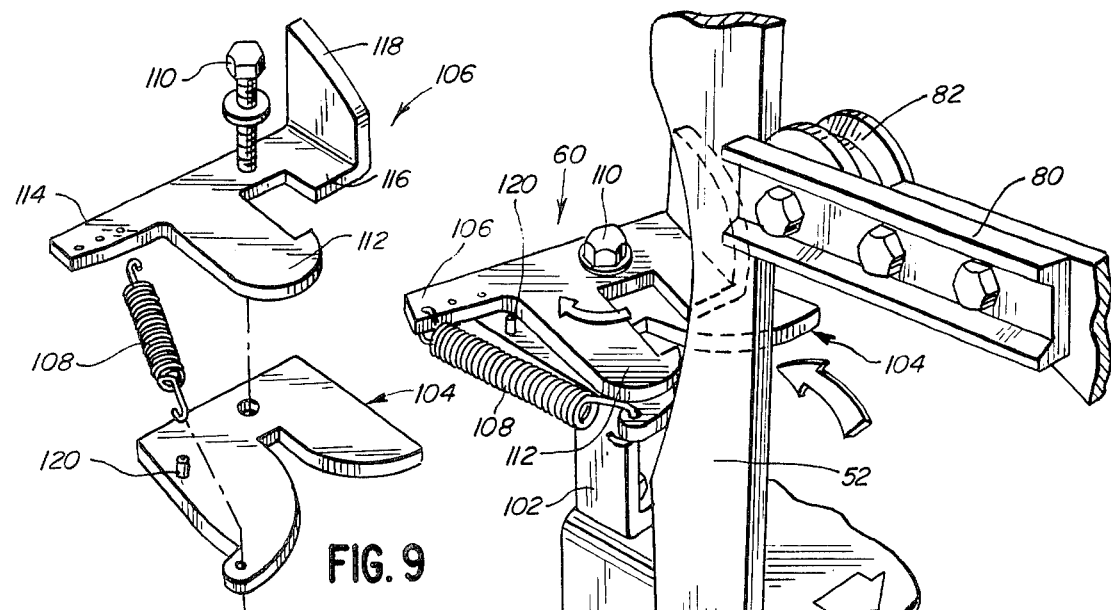
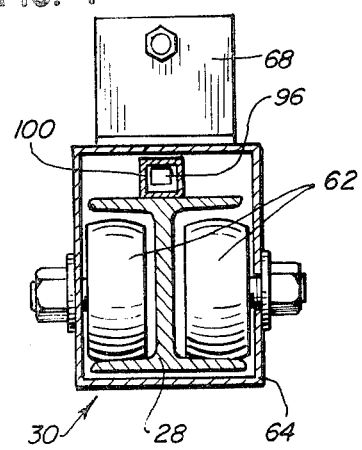
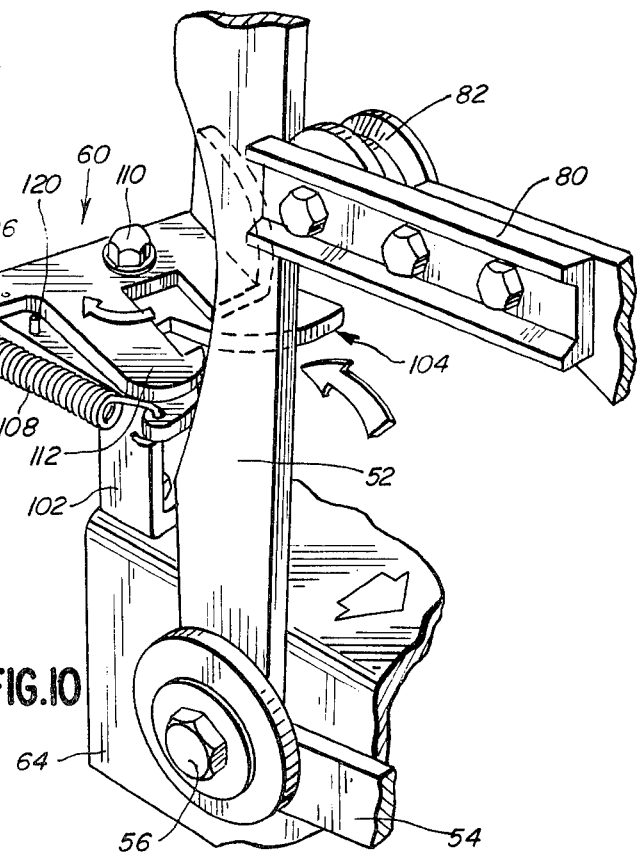
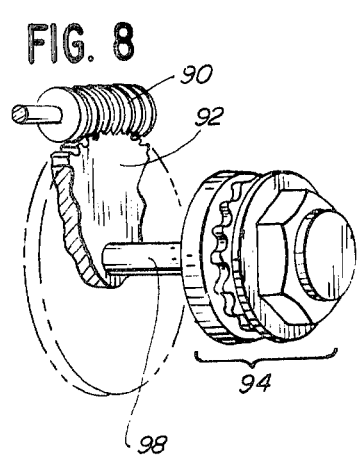
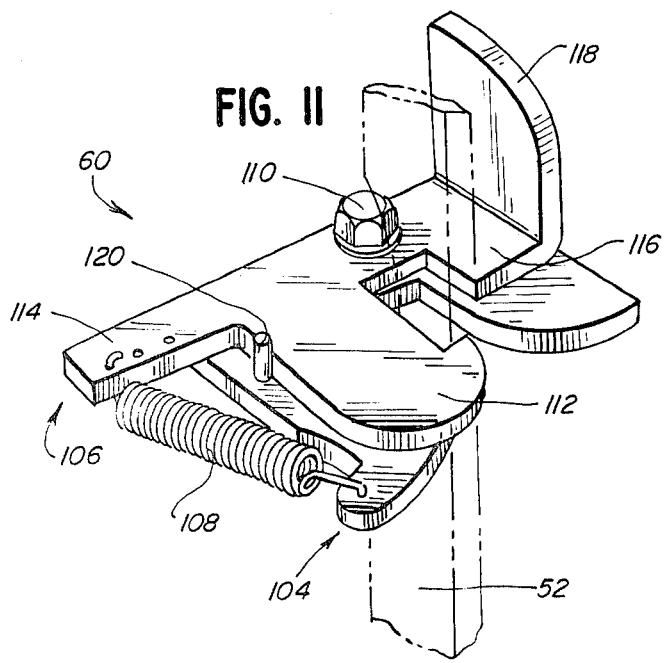

SLUDGE SHOVEL APPARATUS

BACKGROUND OF THE INVENTION

This invention relates to a reciprocative sludge shovel apparatus for removal of solids from a rectangular primary sedimentation tank having a transverse trough for sludge collection or from any sedimentation tank of the type generally used in water purification and sewage treatment plants. More particularly, it relates to a sludge shovel apparatus equipped with a reciprocative trolley assembly and hoist linkage which operate together to carry a sludge shovel in a scooping position from one end of the trough across the trough bottom toward a sludge withdrawal end, to vertically lift the sludge shovel above the sedimentation level, to return the sludge shovel to its starting end and lower it for continued scooping operation. Continuous and efficient sludge removal is thereby effected with minimal disturbance of the remaining sludge during the raising and lowering of the sludge shovel.

In the sludge type treatment of sewage and industrial waste water, sludge materials such as, for example, sand and metal having a specific gravity greater than that of the liquids in which they are suspended are removed from the liquids through gravitational separation in sedimentation tanks. Many such sedimentation tanks are rectangular in plan and have a transverse trough which acts as a collection for storage of the sludge. The sludge within the trough or basin is then conveyed to another location for proper treatment. It is desirable to convey the sludge from the trough both efficiently and in a matter so as not to disturb any remaining sludge in a way which would cause it to redisperse into the liquid.

Conventional sludge removal apparatus employ sludge scraping devices to remove sludge from either the primary sedimentation tank or the collection trough. These sludge scraping devices include submerged continuous chain and flight collector mechanisms which drag sludge material up through the upper level of the liquid, submerged screw collector mechanisms which operate to remove sludge transversely across the tank or trough bottom and scrapers mounted for selected operative positioning on overhead reciprocating carriages. Each of these devices includes its own unique aspects, but each one also entails a number of drawbacks which curtail their performance and adversely affect the overall success of the waste treatment operation. For example, submerged chain and flight and screw collector mechanisms are subjected to an extremely harsh environment of corrosive water and sludge, and their frequent failure necessitates the draining of the entire sedimentation tank for repair purposes. Positionable scrapers, capable of being lifted during the return phase of their back-and-forth motion, have been complex and awkward in their operation and have not been entirely successful in avoiding the undesirable redispersion of metallic oxides and other light-weight sludge materials caused by the lifting of the scraper.

OBJECTS OF THE INVENTION

It is an object of the present invention to overcome the deficiencies experienced with prior sludge removal mechanisms. More specifically, it provides a sludge shovel which is simple in construction and operation, while being superior to prior art devices with respect to performance and reliability.

It is a further object of this invention to provide an improved sludge shovel apparatus, equipped with a reciprocative trolley assembly and hoisting lever, which affords selected vertical adjustment of the sludge shovel for a lower scooping forward phase and an upper no-load return phase of shovel operation.

It is a further object of this invention to provide an improved sludge shovel apparatus which facilitates quick sludge removal while minimizing such sludge redistribution and dispersion as would normally be caused by movement of a conventional sludge shovel into and out of the waste liquid.

It is a further object of this invention to provide an improved sludge shovel apparatus with a simple hoisting means and latching mechanism for vertically lifting the sludge shovel at the sludge withdrawal end of a tank or trough, holding it in an upper position while the trolley assembly returns to a starting position, and vertically lowering the sludge shovel at the end opposite the sludge withdrawal end.

It is still a further object of this invention to provide an improved sludge shovel apparatus which has all of its essential moving parts located above water level so that any maintenance on such parts can be performed without draining the sedimentation tank.

It is still a further object of this invention to provide an improved sludge shovel which may be used for new installations, or to retrofit older installations, particularly where a rectangular sedimentation tank employs a transverse trough for sludge collection.

These and other objects of the invention will be apparent hereinafter from the specification which describes the best mode for practicing the invention as currently known, its use and operation, and a preferred embodiment. Reference should also be made to the drawings, which constitute a part of the disclosure, and the subject matter claimed.

SUMMARY OF THE INVENTION

Generally, the objects of the present invention are accomplished in a reciprocative sludge shovel apparatus having a shovel mounted to an overhead carriage. In the particular application described herein, the invention is used for sludge removal from a collection trough located transverse to the end of a rectangular sedimentation tank. Sludge in the trough is carried by a shovel along the trough bottom for removal at the sludge withdrawal end of the trough.

In a preferred form of this invention, an improved sludge removal apparatus is achieved by utilizing a shovel depending from and laterally positioned by a reciprocative trolley means, in the form of a wheeled carriage slidably engaged with an overhead beam, operating between a forward drop end and a sludge withdrawal end of the trough, and simultaneously causing the shovel to scoop the settled sludge out of the trough. A hoist lever is provided upon the trolley means to lift the shovel vertically at the sludge withdrawal end upon contact with a stationary abutment, and latching means in the form of a spring-biased, hook-shaped latch hold the hoist lever in a fixed position while the chain driven trolley means is propelled by its drive means in the return no-load direction. When the trolley means reaches a stationary abutment at the forward drop end of the trough, the latch is tripped and the hoist lever flips down, lowering the sludge shovel to its scooping position once again. The direction of movement of the trolley means is regulated by electrical control means.

The hoist lever of the present invention is designed to impart substantially vertical motion to the sludge shovel. In this way, no-load return of the shovel is made possible without undue disruption of the underwater sedimentation layer.

BRIEF DESCRIPTION OF THE DRAWINGS

For a more complete understanding of this invention, reference will now be made to the drawings wherein:

FIG. 1 is a perspective view of a rectangular sedimentation tank having a transverse trough for sludge collection, with a sludge shovel apparatus, according to the present invention, mounted above the trough.

FIG. 2 is an elevation view of the sludge shovel apparatus of FIG. 1, illustrating a sludge shovel, a hoisting means, a trolley means with drive means therefor, a latching means on the trolley means and stationary abutment means.

FIG. 3 is a rear perspective view of the sludge shovel blade illustrated in FIG. 1.

FIG. 4 is an enlarged elevation view, partially broken away, of the sludge shovel apparatus of FIG. 1, without the shovel, showing the hoisting means in its latched position, for upward positioning of the shovel, as the trolley means approaches the drop end of the trough.

FIG. 5 is an enlarged elevation view of the sludge shovel apparatus of FIG. 1, without the shovel, showing the hoisting means in its released position, for lowered positioning of the shovel, as the trolley means leaves the drop end of the trough and approaches the sludge withdrawal end.

FIG. 6 is an enlarged elevation view of the sludge shovel apparatus of FIG. 1, without the shovel, showing stationary abutment means at the sludge withdrawal end of the trough coadjutant with the hoisting means to raise the shovel and push the hoisting means into engagement with the latching means.

FIG. 7 is a cross-sectional view of the end of the trolley means illustrated in FIGS. 4, 5 and 6, taken in the direction of the arrows VII—VII in FIG. 5, showing the trolley means slidably engaged with an I-beam.

FIG. 8 is an enlarged perspective view of the drive sprocket and disc clutch used in conjunction with the drive means and illustrated in FIG. 5.

FIG. 9 is an enlarged exploded perspective view of the latching means illustrated in FIGS. 4 and 5.

FIG. 10 is a perspective of the plan view defined by arrows X—X in FIG. 6, showing the hoisting means being pushed by the stationary abutment means into engagement with the latching means.

FIG. 11 is a perspective of the plan view defined by arrows XI—XI in FIG. 4, showing the latching means engaging the hoisting means.

DESCRIPTION OF THE PREFERRED EMBODIMENT

Referring now to FIG. 1, a rectangular sedimentation tank 10 is illustrated including a transverse trough 12 for sludge collection and a sludge shovel apparatus 14 according to the present invention. The trough 12 is located at the end of tank 10 and is defined by a substantially U-shaped channel having a short vertically sloping wall 16 depending from one end of tank bottom 18, a trough bottom 20 adjacent to wall 16 and a longer vertically sloping wall 22 adjacent tank bottom 20 and opposite wall 16. Wall 22 extends to the top of tank 10. The trough has a forward or drop end 24 where the sludge shovel is lowered to a scooping position, and an opposite sludge withdrawal end 26 where the sludge is withdrawn from the trough and conveyed elsewhere for proper treatment. Although the invention will be described as used with a rectangular sedimentation tank having a transverse trough, it is to be understood that it is also compatible with other sedimentation tanks of the type generally used in water purification and sewage treatment plants.

The sludge shovel apparatus 14 is mounted across the top of tank 10 above the trough 12. The apparatus includes an I-Beam 28 which traverses the top of tank 10 and is parallel to the longitudinal axis of trough bottom 20, a reciprocative trolley assembly 30 operatively connected to beam 28 for movement therealong, a hoist lever 32 pivotally connected to the trolley assembly 30 and also connected at one end to a sludge shovel 34. In operation, the details of which will be more fully described hereinafter, the sludge shovel 34 is vertically lowered to the depth of trough 12 at drop end 24, is carried forward by trolley assembly 30 to scoop collected sludge toward withdrawal end 26, is vertically lifted at such withdrawal end above wall 16 by hoist lever 32 and is returned by trolley assembly 30 to drop end 24. Through such repeated operation, sludge is withdrawn from tank 10 via removal through trough 12.

Referring also to FIGS. 2 and 3, and using like numbers to designate like items to assist in understanding the several views, the sludge shovel 34 includes a vertical rod-like member 36 connected at its upper end to hoist lever 32 and at its lower end to a scoop section or blade 38. Blade 38 is shaped in conforming relation to trough 12 and is coplanar with ends 24 and 26 of trough 12. Blade 38 may be made of extruded aluminum sheet, but such material has been found to be susceptible to severe corrosion in waste treatment applications. The use of polyethylene or other suitable plastic material, in the fabrication of blade 38, has been found to overcome the corrosion problem and is, therefore, preferred. A cutaway portion 40 is provided to permit sludge overflow and prevent undue stress on sludge shovel apparatus 14 which might result during operation from excessive sludge build-up in the trough 12. Blade 38 is also fitted with at least one roller 42 rotatably mounted on its perimeter for sliding engagement with at least one wall of trough 12. In the illustrated embodiment, roller 42 rides along wall 16 during the scooping phase of operation.

At its upper end, rod 36 is hooked and the hooked portion is rotatably secured with a cotter pin 44 to hoist lever 32. At its lower end, rod 36 is attached to blade 38 by clamp member 46. A square collar 48, attached to the back face of blade 38 and coextensive with the length thereof, is slidably fitted around a square support and guide member 50 which depends at a substantially right angle to beam 28 from trolley assembly 30. During the scooping phase of operation, blade 38 remains coplanar with trough ends 24 and 26 and is supported by support and guide member 50. Alternative configurations of collar 48 and support and guide member 50 are within the scope of this invention.

Hoist lever 32 consists of a linkage, having an upper arm 52 and a lower arm 54 joined at common ends at approximately a 97° inside angle and pivotally mounted at such common juncture to trolley assembly 30 by bolt 56. Rod 36 is attached to hoist lever 32 at the free end of arm 54. As arm 52 is pulled counter-clockwise away from the direction of arm 54, an upward force is transmitted to rod 36 raising blade 38 and collar 48 attached thereto vertically along support and guide member 50. A simple but effective means is thereby provided for lifting sludge shovel 34 for the return movement of trolley assembly 30 and lowering sludge shovel 34 until collar 48 contacts stop 58, at the base of support and guide member 50, for the scooping phase of operation. The return height of blade 38 can be changed at any time with minimal effort. Moreover, disturbance of remaining sludge in trough 12 is minimized by the vertical removal and insertion of the blade 38.

Referring now to FIGS. 4, 5 and 6, the operation of the sludge shovel apparatus 14 is illustrated in its various phases of operation. FIG. 4 shows a broken side view of the sludge shovel apparatus 14 and depicts both the drop end 24 and the sludge withdrawal end 26 of I-beam 28. Trolley assembly 30 is shown approaching drop end 24. In this no-load return phase of operation, the upper arm 52 of hoist lever 32 is fixedly engaged by latching means 60 and sludge shovel 34 is thereby held in its upper position. The operation of latching means 60 will be more fully described hereinbelow. FIG. 5 shows the release of lever hoist 32 and the lowering of sludge shovel 34 in its lowered scooping position as trolley assembly 30 moves away from drop end 24 and toward the sludge withdrawal end 26 of trough 12. FIG. 6 shows trolley assembly 30 at drop end 26 and the raising of sludge shovel 34.

As also shown in FIG. 7, the trolley assembly 30 of the preferred embodiment is operatively connected to I-beam 28 by means of one or more pairs of rollers or casters 62 which permit sliding movement along the I-beam. The rollers are rotatably mounted to and coplanar with the side walls of a mounting section 64 of the trolley assembly 30, which may be formed from carbon steel rectangular structural tubing. Two angle irons 66 and 68 are welded at either end on the top side of mounting section 64 and are fitted with the hardware necessary to accommodate roller chain attachment. A strut or brace 70 is fixedly attached to the bottom of mounting section 64 for holding the upper end of support and guide member 50. A stop plate 71, in the form of an angle iron, is fixedly attached to the strut 70 and serves to restrain the downward travel of the lower arm 54 of hoist lever 32. Trolley assembly 30 also includes latching means 60.

FIGS. 4 and 5 further illustrate the drop end 24 of the sludge shovel apparatus 14. A vertical stand 72 is mounted to the end of I-beam 28. Attached to stand 72 are a stationary abutment means 74, a control switch 76, and a sprocket 78. Abutment means 74, attached to stand 72 and vertically positioned in conforming relation to latching means 60, coacts with latching means 60 to release arm 52 of hoist lever 32 and thereby drop sludge shovel 34 to its lowered position. Electrical control switch 76, also shown attached to stand 72 in conforming relation to latching means 60, provides one method of reversing the direction of trolley assembly 30. Sprocket 78 is rotatably mounted on stand 72 and comprises a part of the drive means more fully described hereinafter. It will be appreciated that abutment means 74, control switch 76 and sprocket 78 can be mounted in a number of ways at the drop end 24 of the sludge shovel apparatus 14 to accomplish their intended purposes according to the present invention.

FIGS. 4 and 6 further illustrate the sludge withdrawal end 26 of the sludge shovel apparatus 14. Stationary abutment means 80 is mounted forward of the sludge withdrawal end and in alignment with arm 52 of hoist lever 32. In the illustrated embodiment, a roller 82 is mounted at the forward end of abutment means 80. As trolley assembly 30 approaches sludge withdrawal end 26, arm 52 comes into contact with roller 82 and is pushed into locking engagement with latching means 60 whereby sludge shovel 34 is raised for the no-load return phase of its operation.

Suitable electrical control means are also mounted at the sludge withdrawal end 26 for effecting reversal of the direction of movement of trolley assembly 30. In the illustrated embodiment, control switch 84, affixed to I-beam 28, is tripped by the forward movement of angle iron 68 which is affixed to the top side of mounting section 64 of trolley assembly 30. It will be appreciated that the direction of trolley travel can also be reversed on a manual basis.

Referring again to FIGS. 4, 5 and 6, and also now to FIG. 8, a trolley drive assembly 86 is shown situated at the sludge withdrawal end 26 of the sludge shovel apparatus 14. Drive assembly 86 comprises a ½ horsepower electric motor 88, a gear reducer 90, a drive sprocket 92 with a variable speed overload safety device 94, a driven sprocket 78 and a roller chain 96. By the operation of drive assembly 86, travel speed of trolley assembly 30 is regulated and even, steady movement is effected. Overload is prevented by safety device 94 in the form of a sprocket clutch assembly driven off the gear reducer output shaft 98. It is noted that a flexible cable member other than a roller chain may be employed in the trolley drive means. In the preferred embodiment, however, the roller chain 96 is selected because of its strength, its reliability and its adaptablility for use in connection with reversible trolley drive assembly 86 and the variable speed overload safety device 94.

The roller chain rides, during operation, in a channel 100 affixed to the top of I-beam 28. FIGS. 4, 5 and 6 show automatic lubricators 101 and 103, mounted at the drop and sludge withdrawal ends, respectively, of channel 100. Lubricators 101 and 103 effect continuous lubrication of roller chain 96 and insure trouble and maintenance-free operation of the trolley drive assembly 86.

Referring now to FIGS. 9, 10 and 11, the structure and operation of latching means 60 are illustrated. Latching means 60 includes a support member 102, in the form of an angle iron, which is fixedly secured to the top side of mounting section 64 of trolley assembly 30 near the end closest to drop end 24. At the uppermost portion of support member 102, latching means 60 includes a spring-biased, hook-shaped latch. An exploded view of the latch is shown in FIG. 9.

The latch comprises a base member 104 and a swivel member 106 connected by a spring 108 to effect pivotal action about a bolt 110. Base member 104 is formed of a steel plate or other suitable material and is U-shaped with flared ends. The central receptacle portion of base member 104 is shaped to receive arm 52. Swivel member 106 is formed of a steel plate or other suitable material and is substantially T-shaped. The central segment 112 of the T is hooked at its free end so as to form a semi-circular lip. One shoe 114 of the T-shaped swivel member 106 has a free end. The other shoe 116 defines a rectangular receptacle portion for receiving and storing arm 52. Extending vertically at a substantially right angle from the end of shoe 116, is a trip member 118.

Swivel member 106 is superimposed over base member 104, so that the receptacle portion of shoe 116 corresponds to the receptacle portion defined by the U-shaped base member 104 and so that the semi-circular lip of segment 112 traverses a portion of the receptacle portion defined by the U-shaped base member 104, and they are pivotally connected by bolt 110 along the longitudinal axis of the corresponding receptacle portions. Spring 108 connects swivel member shoe 114 to a corresponding flared end of base member 104, whereby segment 112 is biased to close the open end of the U-shaped base member 104. The latching action of spring-biased swivel member 106 is restrained by a stop pin 120 affixed to base member 104 and coadjutant with the inside edge of shoe 114 of swivel member 106.

FIGS. 10 and 11 illustrate the operation of latching means 60. As arm 52 of hoist lever 32 is pushed in the counter-clockwise direction by abutment means 80 and roller 82, segment 112 of swivel member 106 is forced aside and swivel member 106 pivots in a clockwise direction about bolt 110. Once arm 52 is fully within the provided receptacle portion of base member 104, swivel member 106 returns to its normal spring-biased closed position. Arm 52 of hoist lever 32 is thereby engaged, as shown in FIG. 11, and sludge shovel 34 is fixed in its upper no-load return position.

Referring once again to FIG. 4, it will be seen that arm 52 is released at drop end 24 when abutment means 74 contacts trip member 118 and forces swivel member 106 to once again pivot in a clockwise direction about bolt 110. As the lip of segment 112 of swivel member 106 clears the receptacle portion of U-shaped base member 104, the weight of sludge shovel 34 pulls hoist lever 32 away from latching means 60.

In overall operation, most clearly seen in FIGS. 4–6, sludge shovel 34 is lowered as the drop end 24 of trough 12 when stationary abutment means 74 contacts trip member 118 on latching means 60, permitting hoist lever 32 to fall. Simultaneously, switch 76 is tripped and trolley assembly 30 begins moving toward the sludge withdrawal end 26 of trough 12. In this scooping phase of operation, sludge shovel 34 is additionally supported by support and guide member 50. As trolley assembly 30 nears sludge withdrawal end 26 of trough 12, abutment means 80 pushes arm 52 of hoist lever 32 upward into locking engagement with latching means 60. Sludge shovel 34 is thereby vertically raised to its upper no-load return position. Concurrently, switch 84 is tripped by angle iron 68 on trolley assembly 30 and the direction of trolley travel is reversed. Upon completion of this return phase of operation, the entire cycle is repeated. Thus, the sludge shovel apparatus disclosed herein is simple and effective and of universal application in water and sewage treatment facilities.

It is believed that the embodiments herein illustrated and described accomplish all of the above enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims.

What is claimed is:

1. A sludge removal apparatus for a sedimentation tank having a trough generally transverse thereto and with a drop end and sludge removal end, comprising:
    (a) a support beam traversing said tank and extending parallel to said trough;
    (b) trolley means mounted to said beam and including means for reciprocally displacing said trolley means between said drop end and said sludge removal end;
    (c) support and guide means secured to said trolley means and displaceable therewith and having an end thereof disposed within said trough;
    (d) slide means mounted on said support and guide means and being slidably displaceable along and parallel to said support and guide means;
    (e) a sludge shovel secured to said slide means and displaceable therewith for scraping sludge in said trough when said slide means is at generally said an end;
    (f) lever means pivotally mounted to said trolley means including means connected to said slide means whereby pivoting of said lever means causes cooperative associated displacement of said slide means and said sludge shovel thereby; and,
    (g) means for selectively pivoting said lever means.
2. The apparatus as defined in claim 1, wherein:
    (a) said support and guide means extend perpendicularly from said trolley means.
3. The apparatus as defined in claim 1, wherein:
    (a) said an end is maintained within said trough.
4. In a sedimentation tank having a sludge withdrawal end, a sludge removal apparatus comprising:
    a beam traversing the top of said withdrawal end and parallel to the bottom of said tank;
    a reciprocative trolley means operatively connected to said beam for sliding movement therealong between the sludge withdrawal end and the opposite end of said tank;
    a sludge shovel including a guide member depending from the trolley means at a substantially right angle to the beam, a blade member disposed adjacent to and supported by the guide member substantially coplanar with said withdrawal end and said opposite end of the tank, and a collar member slidably fitted around the guide member and affixed to one face of the blade member;
    a hoisting means operatively connected to said reciprocative trolley means, said hoisting means including a lever member on said reciprocative trolley means and a linkage member extending between the lever member and the shovel blade;
    said shovel blade and collar member being movable along the guide member in response to movement of the lever and linkage members to effect selected straight up and down movement of said shovel blade in a plane substantially perpendicular to the longitudinal axis of said beam;
    a positioning means associated with said hoisting means and operable thereon to raise said shovel at said sludge withdrawal end to an upper return position and to lower said shovel at the opposite end of said tank to a lower scooping position;
    a reversible trolley drive means at one end of said beam having a flexible cable member operatively associated therewith, said cable member connected to said trolley means, whereby said sliding movement of said trolley means is effected; and
    a control means for shifting the direction of movement of said trolley means between said sludge removal and opposite ends of said tank, whereby said sludge shovel operates to empty sedimentation from the tank by periodic sweeps of the tank bottom.

5. The sludge removal apparatus of claim 4 wherein said positioning means comprises latching means upon said trolley means and abutment means at the ends of said beam, said latching means operable with said hoisting and abutment means to raise and releasably lock said sludge shovel in the upper return position at said sludge withdrawal end and to lower said sludge shovel at said opposite end of said tank.

6. In a sedimentation tank having a sludge withdrawal end, a sludge removal apparatus comprising:
- a beam traversing the top of said tank, said beam being transverse to said withdrawal end and parallel to the bottom of said tank;
- a reciprocative trolley means operatively connected to said beam for sliding movement therealong between the sludge withdrawal end and the opposite end of said tank;
- a sludge shovel including a guide member depending from the trolley means at a substantially right angle to the beam, a blade member disposed adjacent to and supported by the guide member substantially coplanar with said withdrawal end and said opposite end of the tank, and a collar member slidably fitted around the guide member and affixed to one face of the blade member;
- a hoisting means operatively connected to said reciprocative trolley means, said hoisting means including a lever member on said reciprocative trolley means and a linkage member extending between the lever member and the shovel blade;
- said shovel blade and collar member being movable along the guide member in response to movement of the lever and linkage members to effect selected straight up and down movement of said shovel blade in a plane substantially perpendicular to the longitudinal axis of said beam;
- a reversible trolley drive means at one end of said beam having a flexible cable member operatively associated therewith, said cable member connected to said trolley means, whereby said sliding movement of said trolley means is effected;
- a first stationary abutment means at said sludge withdrawal end of said beam and a second stationary abutment means at the opposite end of said beam, said hoisting means coadjutant with said first abutment means at said sludge withdrawal end to raise said shovel to its return position;
- a latching means upon said trolley means for securing said hoisting means when said shovel is in its upper return position, said latching means coadjutant with said secondary stationary abutment means at said opposite end, whereby said hoisting means is released and said shovel is lowered to its scooping position; and
- a control means for shifting the direction of movement of said trolley means between said sludge removal and opposite ends of said tank, whereby said sludge shovel operates to empty sedimentation from the tank by periodic sweeps of the tank bottom.

7. The sludge removal apparatus of claim 6 wherein said blade member is shaped in conforming relation to the configuration of said tank.

8. The sludge removal apparatus of claim 6 wherein said blade member includes a cutaway portion, whereby damage to said sludge shovel from excessive sludge buildup is prevented.

9. The sludge removal apparatus of claim 6 wherein said blade member includes one or more rollers rotatably mounted to its perimeter for sliding engagement with at least one wall of said tank.

10. In a sedimentation tank having a transverse trough for sludge collection, said trough including a sludge withdrawal end, a sludge removal apparatus comprising:
- a beam traversing the top of said tank, said beam being parallel to the longitudinal axis of said trough;
- a reciprocative trolley means operatively connected to said beam for sliding movement therealong between the sludge withdrawal end and the opposite end of said trough;
- a sludge shovel including a guide member depending from the trolley means at a substantially right angle to the beam, a blade member disposed adjacent to and supported by the guide member substantially coplanar with said withdrawal end and said opposite end of the trough, and a collar member slidably fitted around the guide member and affixed to one face of the blade member;
- a hoisting means operatively connected to said reciprocative trolley means, said hoisting means including a lever member on said reciprocative trolley means and a linkage member extending between the lever member and the shovel blade;
- said shovel blade and collar member being movable along the guide member in response to movement of the lever and linkage members to effect selected straight up and down movement of said shovel blade in a plane substantially perpendicular to the longitudinal axis of said beam;
- a reversible trolley drive means at one end of said beam having a flexible cable member operatively associated therewith, said cable member connected to said trolley means, whereby said sliding movement of said trolley means is effected;
- a first stationary abutment means at said sludge withdrawal end of said beam and a second stationary abutment means at the opposite end of said beam, said hoisting means coadjutant with said first abutment means at said sludge withdrawal end to raise said shovel to its return position;
- a latching means upon said trolley means for securing said hoisting means when said shovel is in its upper return position, said latching means coadjutant with said secondary stationary abutment means at said opposite end, whereby said hoisting means is released and said shovel is lowered to its scooping position; and
- a control means for shifting the direction of movement of said trolley means between said sludge removal and opposite ends of said trough, whereby said sludge shovel operates to empty sedimentation from the trough by periodic sweeps of the trough bottom.

11. The sludge removal apparatus of claim 10 wherein the lever member in the hoisting means comprises an upper section and a lower section angularly disposed to each other and jointly and pivotally mounted at the junction of said sections to a side of said trolley means, the linkage member in the hoisting means being attached to the free end of said lower section of the lever member, and the latching means being arranged on the trolley for engagement of said upper section of the lever member.

12. The sludge removal apparatus of claims 6 or 10 wherein said latching means comprises:
- a U-shaped base member adapted to receive a portion of said hoisting means;
- a T-shaped swivel member having a top segment and a central segment, said T-shaped swivel member pivotally mounted at its top segment to the closed end of said U-shaped base member such that said central segment is laterally spaced from the longitudinal axis of said U-shaped base member;
- a semi-circular lip formed at the free end of said central segment and extending therefrom across the longitudinal axis of said U-shaped base member, said lip and central portion adapted to slide open when struck by said hoisting means portion and to retain said hoisting means portion when pivoted so as to close the open end of said U-shaped base member;
- a spring connecting a first leg of said top segment with a corresponding free end of said U-shaped based member, whereby said lip and central segment are biased to close the open end of said U-shaped base member; and
- a protuberance on a second leg of said top segment, said protuberance coadjutant with said second stationary abutment means to force said swivel member into an open position and thereby release said hoisting means portion.

* * * * *